Sept. 11, 1956               J. O. JACKSON              2,762,472
HOLLOW SHEET METAL PANELS AND METHOD OF MAKING
THE SECTIONS FROM WHICH SUCH PANELS ARE MADE
Filed Feb. 8, 1952                                         7 Sheets-Sheet 1

INVENTOR.
James O. Jackson
BY
HIS ATTORNEYS

Sept. 11, 1956 J. O. JACKSON 2,762,472
HOLLOW SHEET METAL PANELS AND METHOD OF MAKING
THE SECTIONS FROM WHICH SUCH PANELS ARE MADE
Filed Feb. 8, 1952 7 Sheets-Sheet 2
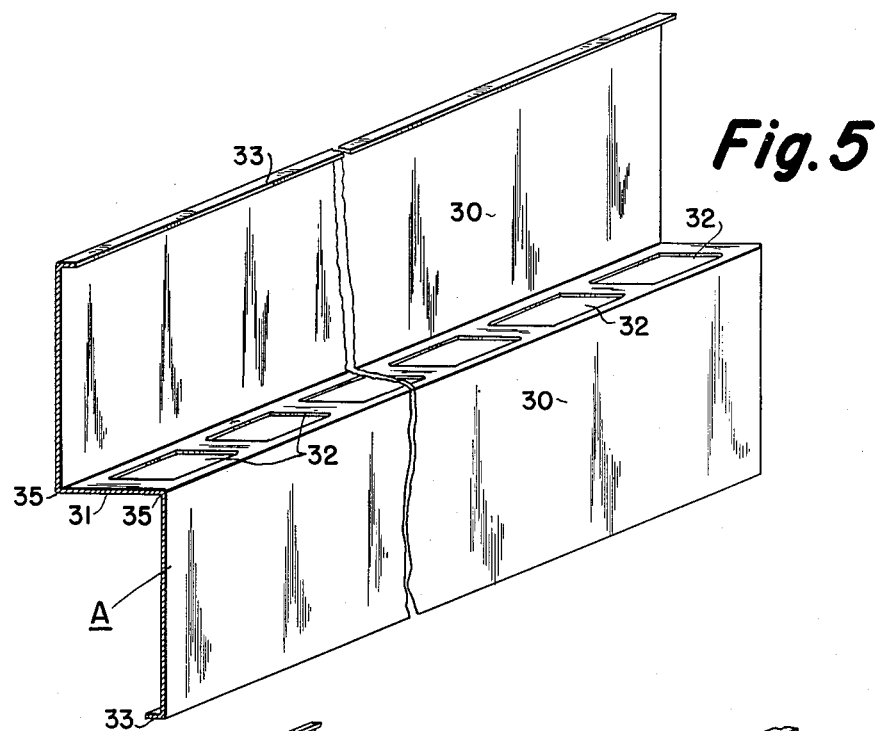
Fig.5
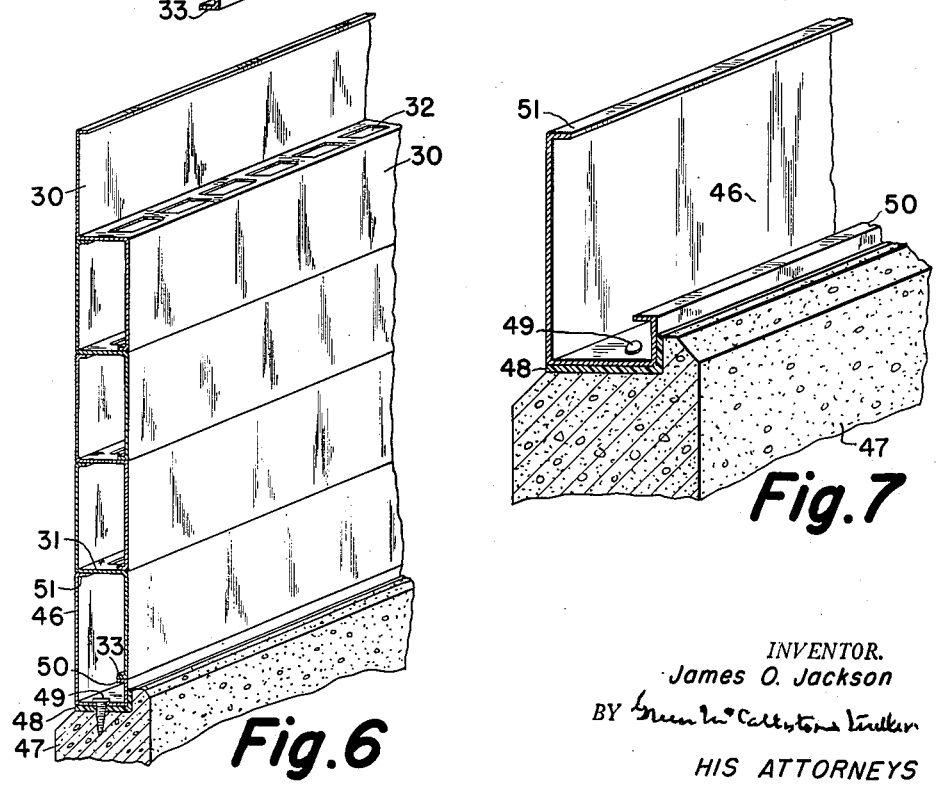
Fig.6
Fig.7
INVENTOR.
James O. Jackson
BY
HIS ATTORNEYS Sept. 11, 1956     J. O. JACKSON     2,762,472
HOLLOW SHEET METAL PANELS AND METHOD OF MAKING
THE SECTIONS FROM WHICH SUCH PANELS ARE MADE
Filed Feb. 8, 1952     7 Sheets-Sheet 3

INVENTOR.
James O. Jackson
BY
HIS ATTORNEYS

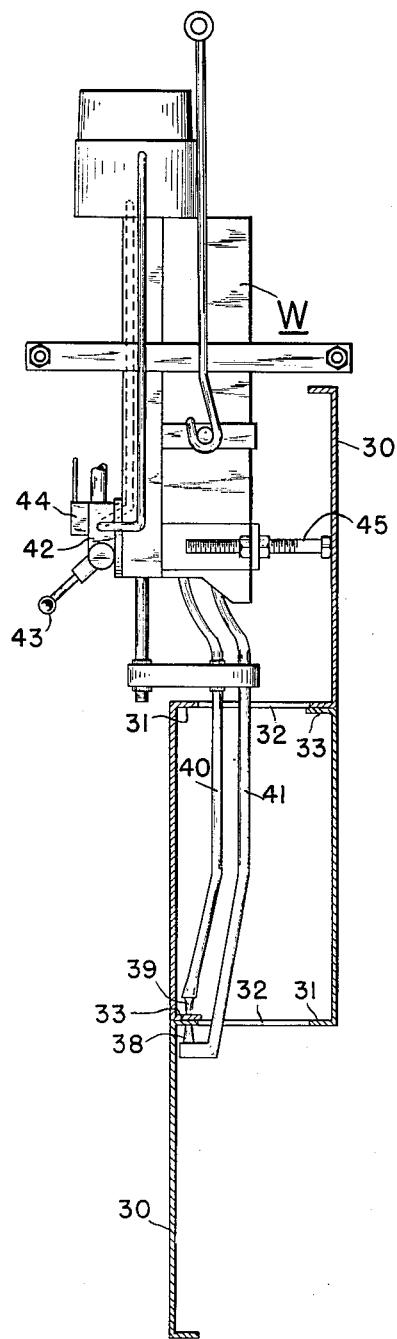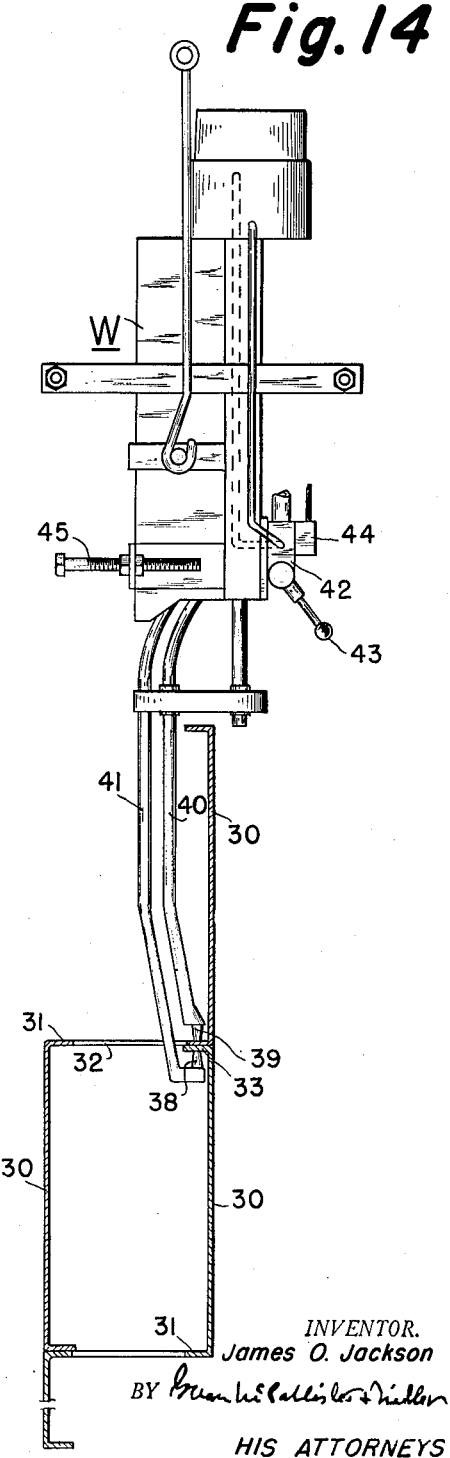

Sept. 11, 1956  J. O. JACKSON  2,762,472
HOLLOW SHEET METAL PANELS AND METHOD OF MAKING
THE SECTIONS FROM WHICH SUCH PANELS ARE MADE
Filed Feb. 8, 1952  7 Sheets-Sheet 5

INVENTOR.
James O. Jackson
BY
HIS ATTORNEYS

Sept. 11, 1956  J. O. JACKSON  2,762,472
HOLLOW SHEET METAL PANELS AND METHOD OF MAKING
THE SECTIONS FROM WHICH SUCH PANELS ARE MADE
Filed Feb. 8, 1952  7 Sheets-Sheet 6
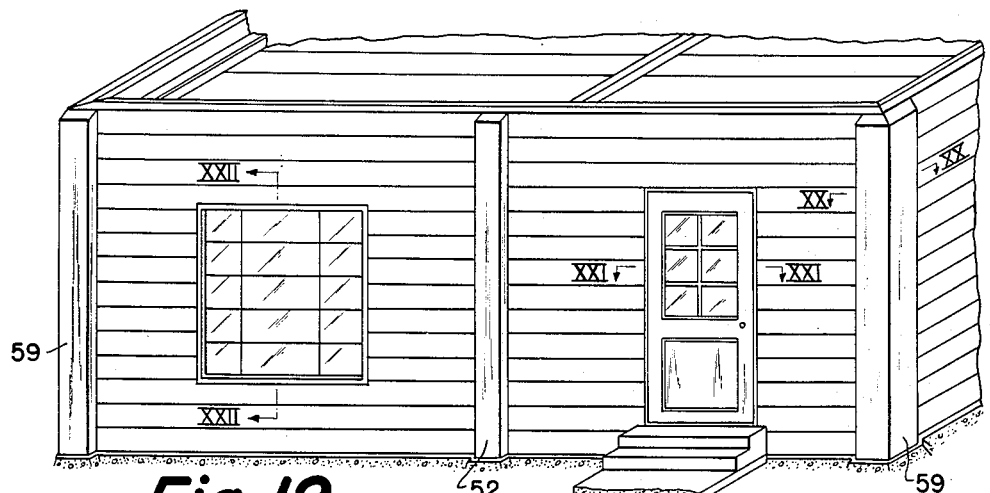
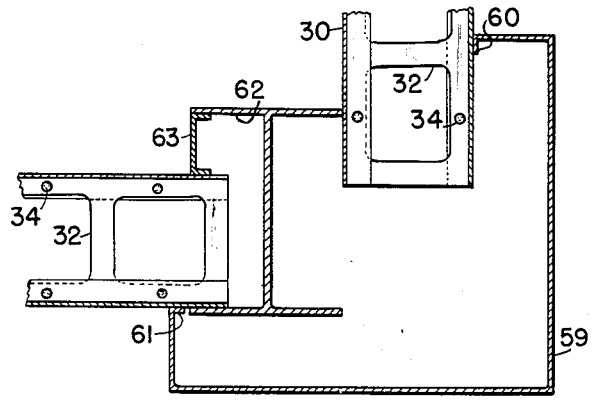
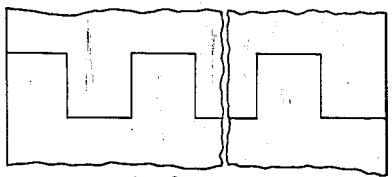
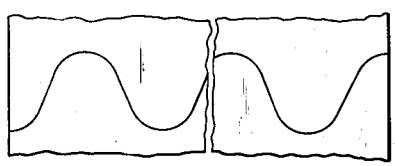
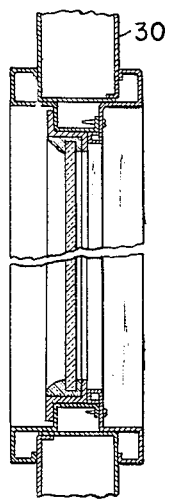
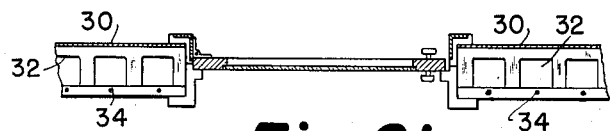
INVENTOR.
James O. Jackson
BY
HIS ATTORNEYS Sept. 11, 1956 J. O. JACKSON 2,762,472
HOLLOW SHEET METAL PANELS AND METHOD OF MAKING
THE SECTIONS FROM WHICH SUCH PANELS ARE MADE
Filed Feb. 8, 1952 7 Sheets—Sheet 7

INVENTOR.
James O. Jackson

BY *Green Mcllvain + Miller*

HIS ATTORNEYS

United States Patent Office 2,762,472
Patented Sept. 11, 1956

2,762,472

HOLLOW SHEET METAL PANELS AND METHOD OF MAKING THE SECTIONS FROM WHICH SUCH PANELS ARE MADE

James O. Jackson, Coraopolis, Pa., assignor to Pittsburgh-Des Moines Company, Pittsburgh, Pa., a corporation of Pennsylvania Application February 8, 1952, Serial No. 270,548

6 Claims. (Cl. 189—34)

This invention relates to hollow metal panels for use in constructing floors, walls and roofs of buildings; to floors, walls and roofs made from such panels; to buildings utilizing such floors, walls and roofs and to methods of making the individual sections from which such hollow panels are made.

An object of this invention is to produce an improved hollow panel from steel sheet or plate material which is suitable for use in constructing hollow insulated floors, walls and roofs for buildings.

Another object is to produce from sheet-like metal, hollow floor, wall and roof structures within which electric wiring as well as heating and plumbing pipes can be located and run in any desired direction.

A further object is to produce a building having hollow metal floor, wall and roof structures, the hollow interiors of which are filled with insulating material and hermetically sealed.

Another object is to produce a metal building with columns and beams and having hollow metal floor, wall and roof structures made up of hollow sheet or plate metal panels which are supported by and welded to such columns and beams and form the inside and outside metal surfaces of such floor, wall and roof structures.

A further object is to provide a method of making sheet or plate metal Z-sections for use in constructing hollow insulated floor, wall and roof structures.

Another object is to provide a method of making sheet or plate metal Z-form sections having webs provided with spaced openings throughout their length without producing any scrap metal.

A still further object is to produce Z-form sections for making hollow floor, wall and roof panels in which those portions thereof which form the outside and inside surfaces of such hollow floor, wall and roof structures are thermally insulated from one another.

A still further object is to produce a hollow insulated sheet or plate metal floor, wall or roof structure in which the sheet or plate members forming the inside and outside metal surfaces of such hollow floor, wall or roof structures are connected by spaced web members of relatively low heat conducting value.

A still further object is to produce a hollow insulated sheet or plate metal floor, wall or roof structure in which the sheet or plate members forming its inside and outside metal surfaces are connected by spaced web members having through openings at spaced intervals throughout their length.

A still further object is to produce a hollow insulated sheet or plate metal floor, wall or roof structure in which the sheet or plate members forming its inside and outside metal surfaces are connected by spaced web members which are provided with means which serve as thermal blocks between such sheet or plate members.

These and other objects, I attain by means of the methods and structures disclosed in the specification and illustrated in the drawings accompanying and forming part of this application.

In the drawings:

Fig. 5 is an isometric view of one type of panel element of this invention;

Fig. 6 is an isometric view of a portion of a wall made up of hollow panels such as disclosed in Fig. 5;

Fig. 7 is a detail view on an enlarged scale of the bottom portion of the wall and foundation disclosed in Fig. 6;

Figure 8:
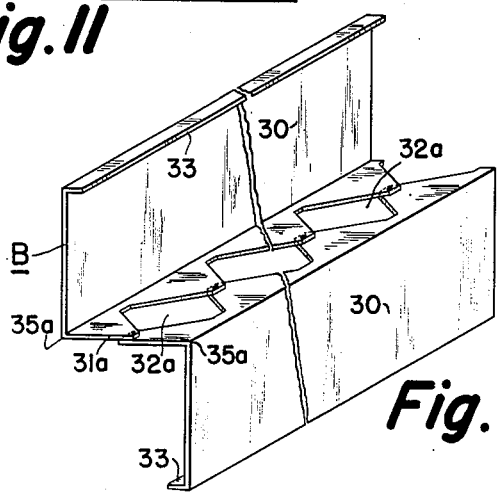
Fig. 8 is a view similar to Fig. 5, but discloses another type of panel section embodying this invention; one which avoids the waste of material inherent in the type disclosed in Figs. 5 and 6.
Figure 15:
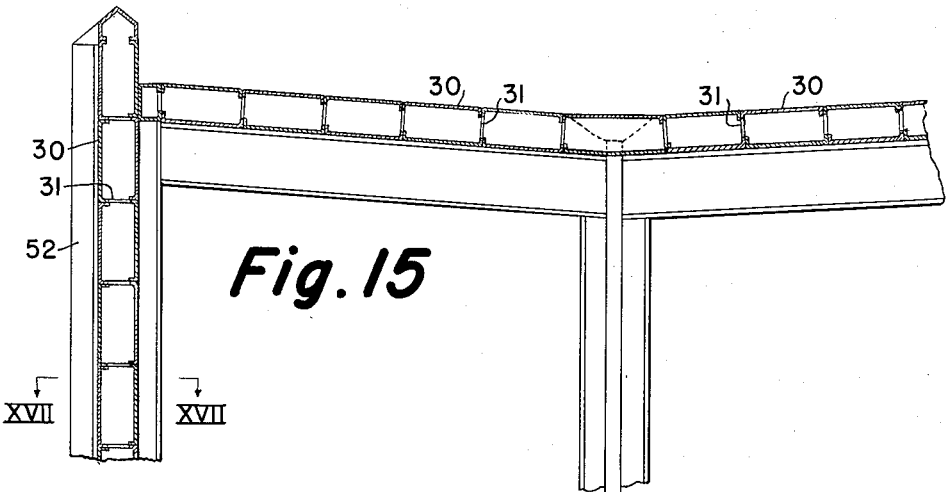
Figure 16:
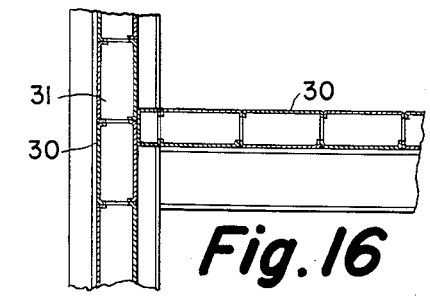
Figure 17:
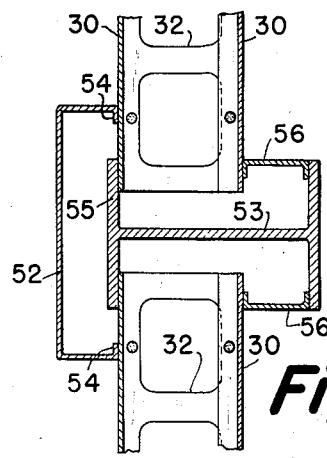
Figure 18:
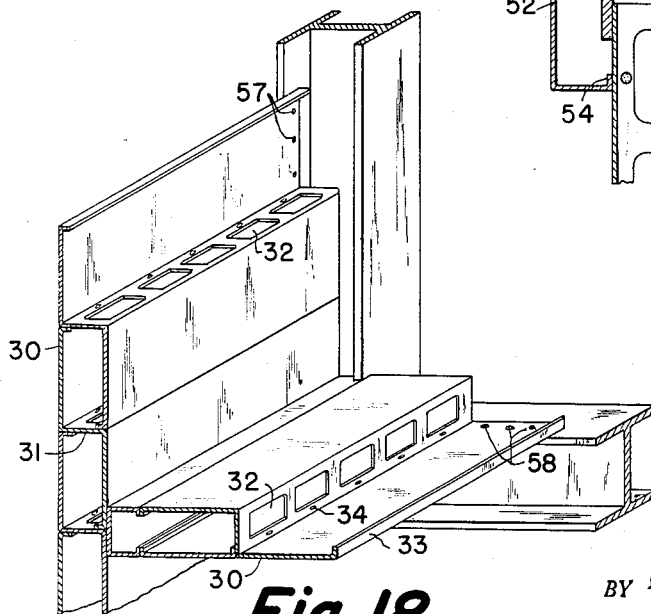
Figure 25:
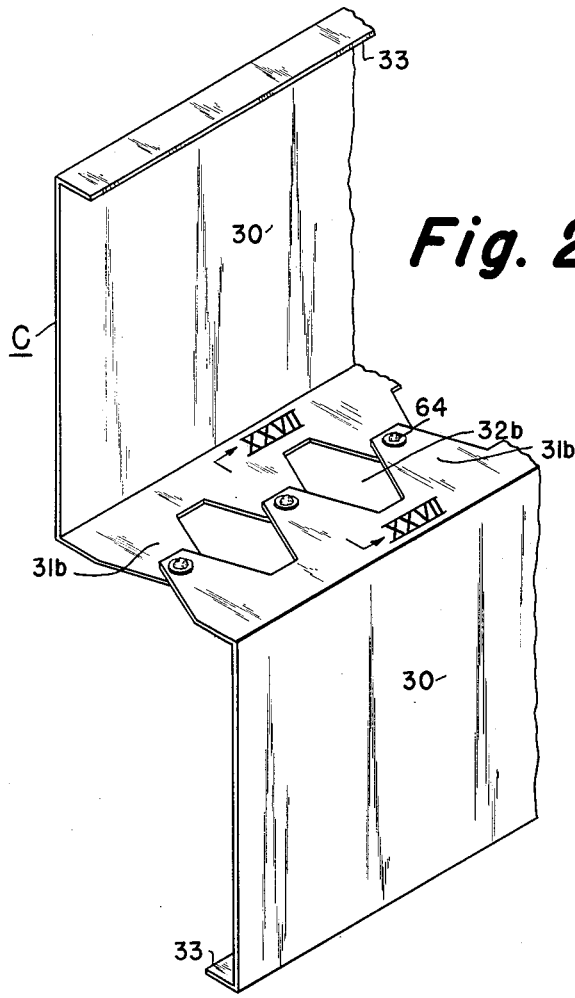
Figure 26:
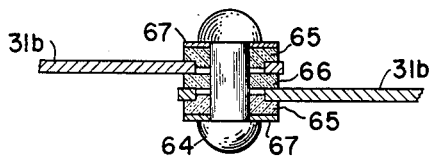

Figs. 9 to 12 inclusive disclose steps by which it is possible to make panel sections of Fig. 8;

Figs. 13 and 14 are more or less diagrammatic views illustrating a portable spot welder which may be used in spot welding together the hollow panel sections to form the hollow panels of this invention;

Fig. 15 is an example of wall and roof structures made up of hollow panels of this invention;

Fig. 16 is an example of a wall and floor structure made up of hollow panels of this invention;

Fig. 17 is a sectional view taken on line XVII—XVII of Fig. 15;

Fig. 18 is an isometric view of portions of a wall and floor of this invention and illustrates their connection to the framing during erection;

Fig. 19 is a fragmentary view in elevation of a one-story building constructed from hollow metal panels embodying this invention;

Fig. 20 is a sectional view of a building corner structure and might be taken on line XX—XX of Fig. 19;

Fig. 21 is a sectional view of a door frame and is a view such as might be taken on line XXI—XXI of Fig. 19;

Fig. 22 is a sectional view of a window and frame such as might be taken on line XXII—XXII of Fig. 19;

Fig. 23 discloses a form of severance line for making hills and valleys on the overlapping edges of panel sections that are rectangular in elevation;

Fig. 24 discloses a severance line for forming hills and valleys that have rounded tops and bottoms, respectively;

Fig. 25 is an isometric view of a Z-sheet or panel element preferably made in accordance with the method steps of Figs. 9–12 inclusive. Instead of welding the halves of the Z-sheet together, such halves are connected by rivets and insulating washers so arranged as to form thermal blocks between the halves;

Fig. 26 is a sectional view taken on line XXVI—XXVI of Fig. 25; and

Figure 27:
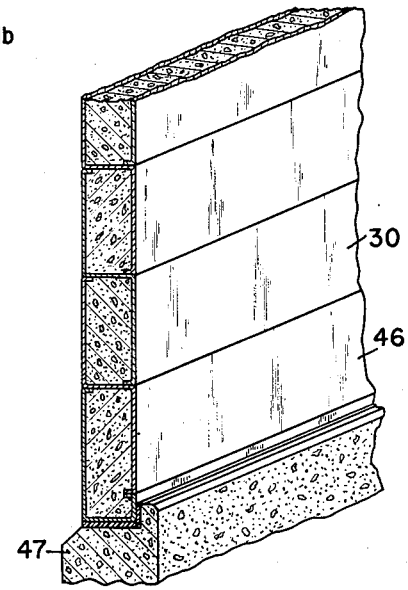

Fig. 27 is a view looking toward the front of a section of a hollow metal insulated wall constructed in accordance with this invention.

Panel sections

The sections from which the hollow panels of this invention are assembled, whether those of Fig. 5 which are lettered A or those of Fig. 8 which are lettered B comprise two flat parts 30 which are parallel to each other and a mid part 31 which stands at right angles to parts 30. Part 31 forms a web which is provided with access holes or through openings 32 spaced at regular intervals throughout its length. The width of webs 31 determines the thickness of the hollow wall structure of this invention as will be apparent from Figure 6.

Figure 1:
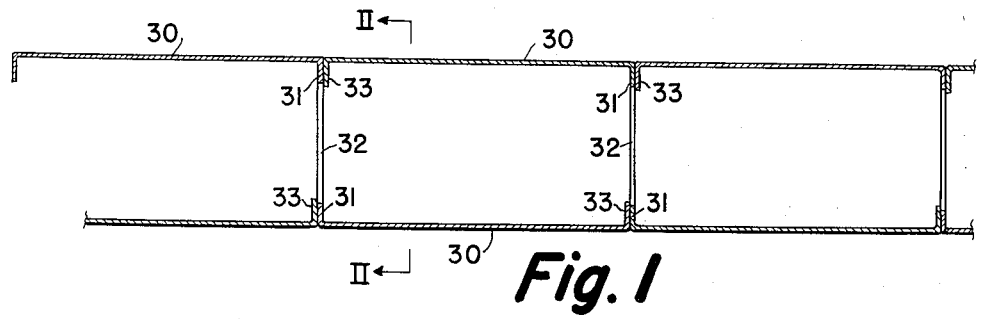
Figure 1 is a sectional view of several hollow sheet metal building panels embodying this invention.
Figure 2:
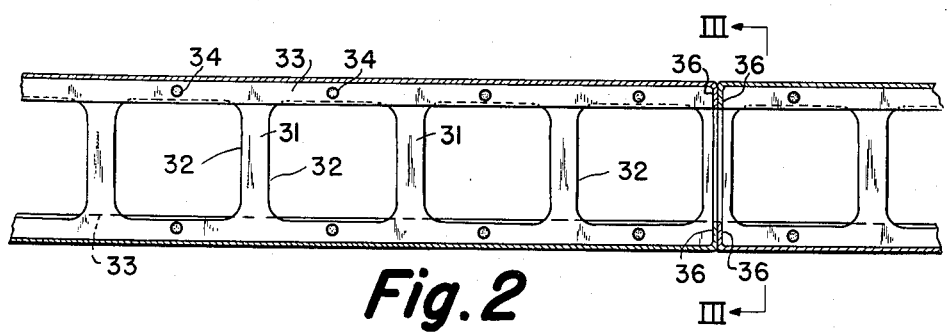
Fig. 2 is a sectional view taken on line II—II of Fig. 1 and discloses the manner of connecting the ends of adjacent panels in accordance with this invention.
Figure 3:
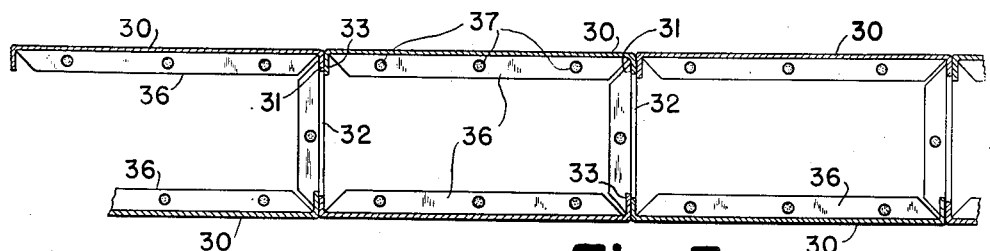
Fig. 3 is a sectional view taken on line III—III of Fig. 2 and discloses two panel sections of this invention connected by internal welds. This view shows the end flanges used when securing panels together in end to end relation.

The outer longitudinal edge of each part 30 remote from the web portion 31 is provided with a relatively narrow flange 33 which extends from end to end of the panel section. In assembling these sections into hollow panels, flanges 33 are welded at spaced intervals as at 34 to the web of the adjacent A panel section as best shown in Figures 1, 2 and 3. It will be apparent from Figures 5, 6, 8 and 18 of the drawings that the part 31 constitutes the web of a Z-bar and that the parts 30 constitute the wings of such Z-bar. It will also be apparent that the right angle flange formed on the edge of each wing is adapted to engage, lie flat against and be secured to the web portion of an adjacent Z-bar or a flat member similar to the web of a Z-bar.

Access holes or openings 32 are preferably formed in the sheet before right angled bends 35—35 and flanges 33 are formed.

The panel sections and therefore the hollow panels made or assembled therefrom are preferably of a length to extend from column to column, if the hollow panels are to form a wall, or from beam to beam if they are to form a floor or roof.

If the ends of adjacent hollow panels are to be connected, the panel sections are provided with relatively narrow end flanges 36. Figure 3 shows the ends flanges of one hollow panel welded as at 37 to the end flanges of the next panel in line therewith.

In making a B panel section (Fig. 8) a metal sheet or plate preferably steel of the proper gauge, length and width is severed adjacent its longitudinal center line into two parts along a line, which for each such part, produces a notched edge (Fig. 10) which extends throughout the length of such part and comprises alternate hills and valleys so arranged that one end of such line of severance terminates at the top of one of the hills and the other terminates at the bottom of one of the valleys.

Figure 10:
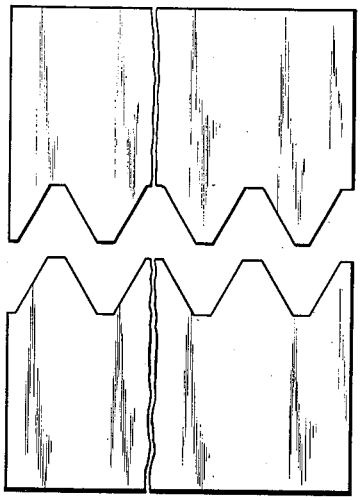
Figure 11:
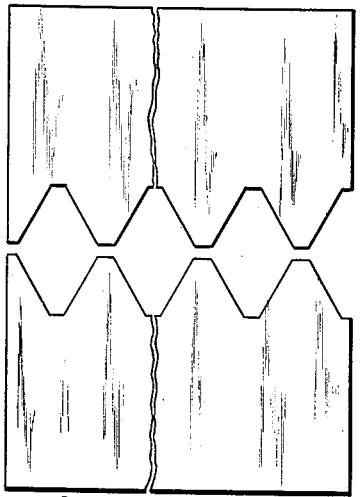
Figure 12:
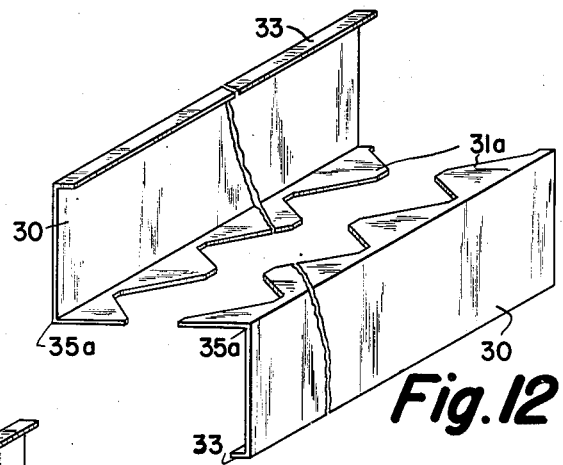

The parts are then separated as in Fig. 10 and one part is then turned end for end (Fig. 11) in such manner that the severed edges of such two parts are facing each other.

The edge portion of each such part, which includes the severed edge with its hills and valleys, is then bent at right angles to the major portion of such part (Fig. 12) and if desired, flanges 33 can be formed at the same time that the right angled bends 35a are made.

The hills of one part are so placed with relation to the hills of the other part that such hills slightly overlap and these overlapping hill portions are then preferably spot welded together (Fig. 8).

The spot welding of the two parts together to form a B panel section such as shown in Fig. 8 is preferably carried on in the shop so that the complete panel sections can be nested and shipped to the place of use. The valleys between the hill portions form the access holes or openings 32a.

The B form of panel section not only avoids the waste metal due to the formation of access holes or openings 32 of the A panel, but B panels can be formed from narrower sheets than A panels. The sheets forming the B panel sections can be narrower than the sheets forming the A panel sections in an amount equal to the distance from one right angled bend 35a to a line extending longitudinally of the web portion 31a and passing through the centers of the spot welds between the overlapping hill portions. From this, it will be seen that in making B panel sections there is a material saving in metal over A panel sections.

Figs. 25 and 26 disclose a C panel section. These C panel sections are preferably made in the same manner as the B panel sections and as disclosed in Figs. 9–12 inclusive. The teeth which form the web portion of the panel section are here numbered 31b and the access openings 32b. Opposed teeth 31b instead of being weld connected together as are teeth 31a of the B panel sections, are riveted together and the teeth of one half are insulated from those of the other half.

Teeth 31b adjacent their outer ends are provided with oversized holes for rivets 64 and for this reason, teeth 31b are overlapped slightly more than teeth or tooth portions 31a of the B panel sections. These holes are bushed with insulating washers 65—65 which have reduced portions which enter the holes. A plain insulating washer 66 is positioned between the overlapped toothed portions 31b and metal washers 67 lie outside of washers 65—65. Rivets 64 rigidly hold the assembly of insulating washer-bushings, metal washers and teeth 31b together so that the C panel sections can be handled and nested in the same manner as the A and B panel sections.

In hollow insulated floor, wall and roof structures utilizing A panel sections, the transfer of heat from one wall surface to the opposite wall surface is minimized because of openings 32 in the web members which connect the opposite walls. The transfer of heat is less when B panel sections are used, since the spot welds connecting the tooth portions 31a—31a of the web sections or members have an extremely small area as compared with that of the web and therefore conduct correspondingly less heat. The transfer of heat from one wall to another in hollow wall, floor or roof structures made from panel sections of the C type is reduced to almost zero since the insulating washers serve as thermal blocks.

Assembling sections into hollow panels

Figs. 13 and 14 disclose more or less schematically a procedure of spot welding together two panel sections to form a hollow panel of this invention.

I preferably make use of a portable welder W, which is provided with gripping jaws 38 and 39 carried by arms 40 and 41 arranged for relative longitudinal movement. One such arm is preferably fixed, say arm 41, while the other is moved with relation thereto by a reciprocating air motor forming part of the welder. Such air motor is preferably controlled by a valve 42 having a handle 43, and the flow of electric current through arms 40 and 41 is under the control of a switch 44 adjacent air valve handle 43.

In Figure 13, the upper flange 33 of the right-hand panel section is being welded to web 31 of the left-hand panel section. A welder support which takes the form of an adjustable bolt 45, rests on lower part 30 of the right-hand panel section, forms a temporary support for the welder and assists in holding jaw member 38 in position adjacent the top of web 31 of the left-hand panel section.

In Fig. 14, the lower flange 33 of the left-hand panel section is being spot welded to web 31 of the right-hand panel section; the welder having been turned over for this purpose.

Instead of turning over the welder between each pair of upper and lower welds as depicted in Figs. 13 and 14, I find it preferable to make all the upper welds throughout the length of a panel section before making the lower welds. This procedure requires but one turning over of the welder.

In the building shown in Fig. 19 the walls, floor and roof are constructed of hollow panels of this invention; the panels being supported by suitable columns and beams or girders as in curtain wall construction.

In erecting an outer wall such as disclosed in Fig. 6, the hollow panels are preferably of such length as to fit inside the column flanges as indicated in Fig. 17.

In erecting such wall, a bottom or closure panel or member 46 (Figs. 6 and 7) made of relatively heavy gauge sheet-like material is bent so as to form a flanged L member. This L member is slipped into place between the upright I-beam column members (not shown) and placed on top of a foundation wall 47. The wall is sealed to the foundation by means of a mastic compound layer 48 and closure member 46 is secured in place on the mastic layer by suitable hold-down elements 49 such as screws which extend through the lower leg of the closure member and are embedded in the concrete foundation.

Flange 33 of the lowest regular panel section of the wall is welded to flange 50 of the closure member and flange 51 of such member is welded to the web of such bottom panel section (Fig. 6).

It will be understood that all the welds between the first regular panel section and closure member 46 will be completed before the second panel section is added to the wall structure. It will also be understood that all the welds connecting the second panel section to the first panel section will be completed before the third panel section is added to the wall.

The details of the wall structure adjacent an intermediate pilaster or closure member 52 (Fig. 19) are illustrated in Fig. 17 which is a detailed sectional view through the closure member, the wall section and the I-beam column member 53. The closure member is welded to the wall sections on opposite sides of column member 53 and is spaced from the outer flange 55 of such column. The spaces between the inner flange of I-beam column 53 and the inner face of the hollow wall are filled with U-shaped closure members 56 which are welded in place.

Fig. 18 discloses a typical side wall and second floor structure and the connections between the wall and the floor and the columns and girders.

It will be apparent that the spot welds which are shown at 57 and 58 may be readily made during erection of the structure.

Fig. 15 illustrates another roof and wall structure embodying this invention, and Fig. 16 discloses another floor and wall structure.

Figs. 21 and 22 respectively show door and window structures which may be used with walls constructed in accordance with this invention.

The corner pilasters or closures 59 as shown in detail in Fig. 20 are provided with inturned flanges 60 and 61 which are weld connected to the hollow panel side and front walls respectively. The opening between the back of the front wall and flange 62 of the corner I-beam is closed with a trough-like closure member 63 which is welded to the I-beam flange and the inner face of the front wall.

Openings for the windows and doors may, if desired, be cut in the walls after erection. Where the openings are cut after erection, the frames may be constructed so that the halves can be inserted from opposite sides of the wall and then secured together to form a unit.

It will be apparent that plumbing pipes or tubes, heating pipes and electrical wiring cables or conduits can be run lengthwise through the hollow panels forming the floors, walls or roof as well as across the structures through access openings 32 in the panel webs. The pilasters or closures provide ample space for carrying such pipes, tubes or conduits to whatever level or floor desired.

Fig. 27 is a fragmentary section of a typical side wall of this invention. These side walls are most suitable for use with a steel frame construction, since they may be attached to such frame by welding.

After the panel sections of either the A, B or C form are welded together to form the hollow walls of this invention made up of hollow panels interconnected by web openings 32, 32a and 32b, as the case may be, such hollow walls may be filled with insulating concrete which gives the panels and therefore the walls rgidity and low thermal transmission.

I believe from my computations that a wall 6 inches thick may be insulated so that it has an equivalent heat transmission of over 17 inches of solid concrete or so that it is equal to a 4 inch course of brick backed by 8 inches of hollow tile. The weight of the side walls is transmitted to the steel columns and thence to the foundation so that heavy footers under the side walls are not required.

The hollow roofs of this invention are of the same basic construction as the walls and comprise a repeating sequence of panel elements which are welded in the field into complete hollow roof structures comprising hollow panels which are interconnected by reason of the through openings in the webs of the panel elements. Usually purlins are not required since the hollow panels may be economically designed for spans up to 30 feet or more. After erection, the interior spaces of the hollow panels may be filled with light weight insulating material which results in as low a thermal conductivity as insulated roofs of other types.

The hollow floors of this invention are of the same general construction as the side walls and roof structures. They are preferably shop fabricated to fit particular building areas and are erected quickly after the steel frame is in place so that a working surface is provided at an early stage in the construction of the building. The hollow panels making up the floors may be designed for any floor load by varying their depth and/or thickness of the metal from which they are made. Any type of floor surface such as a two-inch concrete fill may be used; placing such fill on the top of the floor panels, or a surface such as asphalt flooring may be cemented to the steel surface.

When a unit or building is nearing completion, but openings still exist to the interior of the wall, roof and floor structures, and after all wiring and plumbing pipes or tubes have been installed, the hollow structures comprising the panels, closure members and pilasters are filled with insulating material.

As insulating material for the side walls and floors I prefer a light weight mixture of Portland cement and Perlite. Such a mixture may be pumped into the hollow interiors of the walls and floor until all spaces therein are filled. This mixture sets to a rigid concrete-like mass having good insulating properties and its rigidity materially reduces the sound amplifying characteristics of the steel surfaces. Blown wool or granular type insulating material may be used where the sound amplifying characteristics of the steel surfaces are not objectionable.

For roof insulation, I prefer a light weight insulating material such as blown wool, a suitable granular material or a cast-in-place foaming type material.

Figures 4, 4A:
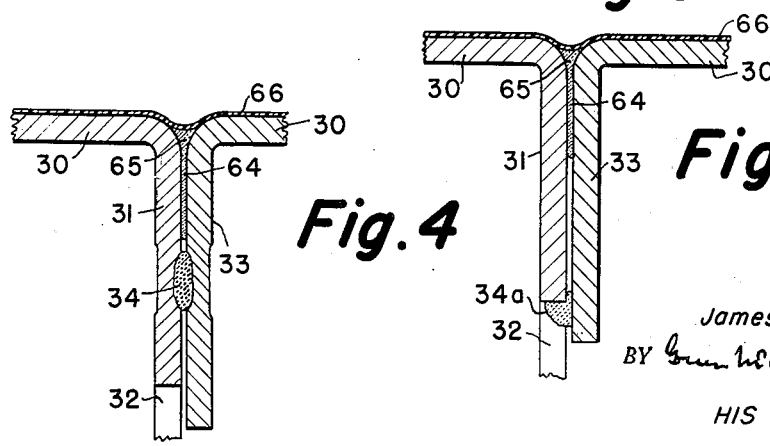
Fig. 4 is an enlarged detail view of a portion of a joint between two panel sections that are spot welded together. This view also discloses a method of sealing the joints between panel sections as well as between contiguous panels making up a hollow floor, wall or roof structure of this invention.
Fig. 4a is a view similar to Fig. 4, but here the panel sections are tack welded together.
Figure 9:
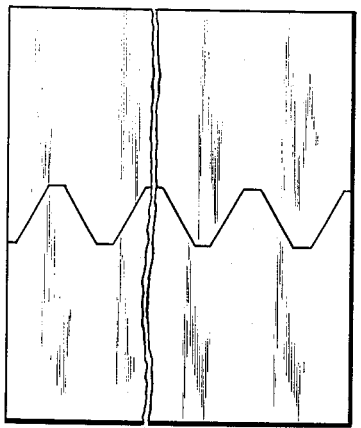

After the hollow structures have been insulated and all closure members welded in place, all joints and spaces between contiguous panels are sealed, preferably with aluminum filled Vinylite resin VMCH solution which is forced into the joints with a pressure gun until the resin has penetrated each joint to a depth equal to from three to four metal thicknesses as shown at 64', Figs. 4 and 4a. The joints are then wiped to smooth fillets 65'. The Vinylite resin solution hardens within the joints and forms tightly adhering seals, thus hermetically sealing the hollow interiors of the entire structure.

When erection, installation and sealing is complete, the whole structure is preferably given two coats of Vinylite resin VAGH pigmented finish as shown at 66', Figs. 4 and 4a.

If it is desired to make one face of the wall or roof structure of this invention of a different metal from the opposite face, this can readily be accomplished by using either the B or C form of Z sheet or panel element.

After fabrication and before shipment, the Z sheets or panel elements are cleaned of metal scale, dirt, grease and other contaminants by a solvent cleaning followed by either sand-blasting or pickling. After cleaning, they receive at least one coat of Vinyl butyral resin, basic zinc chromatic, phosphoric acid wash primer followed by one coat of Vinylite resin VAGH, pigmented finish to inhibit corrosion and to act as a primer for finish treatments on exposed surfaces and to protect clean surfaces during shipment.

While the previous description contemplates that the bent sheets (Z elements) will be shipped to the site of the building and there assembled into hollow panels, under certain conditions it may be desirable to build up the panels to convenient sizes in the shop. In some instances it may also be desirable to install the insulating materials in the shop and to ship the larger panels to the site of the building, there to be set in place in the wall, floor or roof structure and tack or spot welded to the structural framework as previously described. Whether the assembly of the Z sections into hollow panels is done in the shop or at the site of the building, the same operations will be performed as above described.

Hollow metal panels having a superficial resemblance to those of this invention are disclosed in a number of United States patents, some of which are: No. 14,208 issued February 5, 1856; No. 994,116 issued June 6, 1911; No. 1,548,809 issued August 4, 1925; No. 1,972,570 issued September 4, 1934; No. 1,988,214 issued January 15, 1935; and No. 2,026,278 issued December 31, 1935. So far as I am aware, none of the disclosures of any of these patents has had any influence on the metal building art.

What I claim is:

1. A method of making a hollow panel element from sheet metal parts, which consists in severing a substantially rectangular piece of sheet metal into two parts along a line intermediate the lateral edges of the piece so as to produce a serrated edge along the severed portion of each such part, such edge extending throughout the length of each such part; turning one such part end for end to invert the same relatively to the other part, then securing the tips of the serrations of each part together to thereby form a series of openings between the parts with such series extending from end to end of the thus joined parts; forming a Z-bar from the parts so joined with the intermediate portion of the joined parts constituting the web of the Z-bar; and then assembling two such Z-bars to form a hollow panel element, with the web of each such Z-bar forming one of each of two opposed and parallel sides of the hollow element and with a wing of each such Z-bar forming one of the two opposed parallel extending lateral walls of such element; and then securing the edge portion of one wing of each such Z-bar to the web portion of the other such Z-bar.

2. A method of making a hollow panel element from sheet metal parts, which consists in cutting a substantially rectangular piece of sheet metal into two substantially equal parts by severing it intermediate the lateral edges of the piece so as to produce a serrated edge along the severed portion of each such part, such serrated edge extending throughout the length of each such part; turning one such part end for end to invert the same relatively to the other part; overlapping the tips of the serrations of the two parts and securing such overlapped tips together to thereby form a series of spaced openings between the parts with such series extending from end to end of the thus joined parts; forming a Z bar from the parts so joined with the intermediate portion of the joined parts constituting the web of the Z bars; and then assembling such Z bars with a second Z bar to form a hollow panel element with the web of each such Z bar forming one of each of two opposed parallel sides of the hollow element and with a wing of each such Z bar forming one of two opposed lateral walls of such element; and then securing the edge portion of one wing of each Z bar to the web portion of the other Z bar.

3. A metal building structure including in its make-up metal columns and a hollow sheet metal wall structure extending between, supported by, and secured to at least one of such columns and consisting of a plurality of superimposed box-like structures, each such box-like structure including in its make-up two Z bars with the web portion of one such bar forming the top of such box-like structure and the web portion of the other such bar forming the bottom of such box-like structure and with a wing of one such bar forming one lateral wall of such box-like structure and a wing of the other such bar forming the other lateral wall of such box-like structure, the edge portion of each such wing engaging and secured to the web portion of an adjacent Z bar; each Z bar forming a part of a box-like structure being formed in two parts with each such part including a wing portion and having a serrated edge remote from said wing portion, extending longitudinally thereof and from end to end of said part and secured to the other part at the tips only of the serrations of said edges.

4. A hollow sheet metal wall structure consisting of a plurality of box-like structures located adjacent each other, with each such box-like structure extending parallel to adjacent box-like structures and being made up of two overlapping Z bars with the web of one Z bar forming one side of such box-like structure and the web of the other Z bar forming the opposite side of such box-like structure and with a wing of one such bar forming a lateral wall of such box-like structure and a wing of the other bar forming the other lateral wall of such box-like structure, with each such wing having a right angle flange formed along the free edge thereof and extending from end to end thereof and lying flat against and secured to the web portion of an adjacent Z bar; each such Z bar forming a part of one such box-like structure being formed in two substantially similar parts, with each such part including in its make-up one wing portion with a right angle flange formed thereon and a part of a web portion having a serrated edge extending longitudinally of said wing and from end to end of said part and secured to the other part at the tips only of the serrated edges of the two parts.

5. A metal building structure including in its make-up metal columns and hollow sheet metal wall structure extending between said columns and secured to at least one such column and consisting of a plurality of adjacently located box-like structures each of which includes in its make-up two overlapping Z bars with the web portion of each such Z bar extending substantially at right angles to the wing portions thereof and with the wing portions of such overlapping bars forming two opposed walls of such box-like structure and the web portions of such overlapping Z bars forming the other two opposed walls of such box-like structure, the edge portion of each such wing portion engaging and secured to the web portion of an adjacent Z bar of such wall structure; each Z bar forming a part of a box-like structure being formed in two parts, with each such part including a wing portion and a part of a web portion with the edge portion of each such web part serrated from end to end thereof and with the separate parts of each such Z bar secured together at the tips only of such serrations.

6. A metal building structure including in its make-up metal columns and a hollow sheet metal wall structure extending between said columns and secured to at least one of said columns and consisting of a plurality of superimposed box-like structures each of which includes in its make-up two overlapping Z bars, with the web portion of one such overlapping bar forming the top of such box-like structure and the web portion of the other such overlapping bar forming the bottom of such box-like structure and with a wing portion of one such overlapping bar forming one lateral wall of such box-like structure and a wing portion of the other such overlapping bar forming the other lateral wall of such box-like structure, each such wing portion having a right angle flange formed on and extending along the free edge thereof, such flange engaging, lying flat against and secured to the web portion of an adjacent Z bar; each Z bar forming a part of a box-like structure being formed in two parts with each such part including a wing portion and a part of a web portion, such web portion part having a serrated edge, with the serrations thereof substantially equally spaced and extending from end to end thereof and with the separate parts of each such Z bar secured together at the tips only of such serrations.

References Cited in the file of this patent

UNITED STATES PATENTS

| | | |
|---|---|---|
| 1,498,176 | Lachman | June 17, 1924 |
| 1,644,940 | Moyer | Oct. 11, 1927 |
| 1,972,570 | Moore | Sept. 4, 1934 |
| 1,988,314 | Higley | Jan. 15, 1935 |
| 2,052,346 | Garrett | Aug. 25, 1936 |
| 2,100,957 | Hoffman | Nov. 30, 1937 |
| 2,180,502 | Bonsall | Nov. 21, 1939 |
| 2,184,113 | Calafati | Dec. 19, 1939 |
| 2,186,310 | Von Hoefen | Jan. 9, 1940 |
| 2,439,960 | Auten | Apr. 20, 1948 |

FOREIGN PATENTS

| | | |
|---|---|---|
| 393,771 | Great Britain | June 15, 1933 |
| 791,124 | France | Sept. 23, 1935 |